United States Patent [19]

Dyck

[11] 4,139,165

[45] Feb. 13, 1979

[54] PARALLEL-FEED TAPE SPOOLING APPARATUS FOR CONCURRENT WINDING OF MAGNETIC TAPES ONTO A PLURALITY OF SPOOLS OF THE TYPE USED IN ENDLESS TAPE CARTRIDGES

[75] Inventor: Arthur Dyck, Burnaby, Canada

[73] Assignee: International Audio Visual, Inc., Glenview, Ill.

[21] Appl. No.: 854,837

[22] Filed: Nov. 25, 1977

[51] Int. Cl.[2] .......................................... B65H 19/04
[52] U.S. Cl. .............................. 242/56.9; 242/67.3 R; 242/75.43
[58] Field of Search ............ 242/56.9, 67.1 R, 67.3 R, 242/55.19 A, 75.3, 75.43

[56] References Cited

U.S. PATENT DOCUMENTS

| | | | |
|---|---|---|---|
| 2,684,210 | 7/1954 | Conti | 242/56.9 |
| 2,755,029 | 7/1956 | Speed | 242/56.9 |
| 3,779,476 | 12/1973 | Hofbauer | 242/67.3 R |
| 3,967,789 | 7/1976 | Deletzke | 242/67.3 R |

*Primary Examiner*—Edward J. McCarthy
*Attorney, Agent, or Firm*—Hill, Gross, Simpson, Van Santen, Steadman, Chiara & Simpson

[57] ABSTRACT

A plurality of strands of magnetic recording tape are withdrawn in parallel feed paths from tape supply reels and are fed by a tape feed assembly at a controlled, high speed rate to a takeup assembly and wound thereat on a corresponding plurality of tape cartridge spools, of the endless tape type, that are rotated by a takeup shaft. The takeup shaft is driven at a spooling rate that is faster than the feed rate and each of the spools are drive coupled to the takeup shaft by individual, adjustable slip-clutch hub assemblies which cause the tape strands to be wound at individually adjustable spooling tensions which must be carefully regulated to insure proper operation of the spooled tapes when assembled in the endless tape cartridge. Each of the supply reels holds sufficient tape for filling numerous individual spools and as each set of spools on the takeup shaft becomes full, the strands of tape are cut and the full spools are withdrawn and replaced with empty spools. At all times during the exchange of spools, the strands of tape from the supply reels are held captive by a tape threading bar assembly which includes a plurality of tape clamps carried on an elongate bar that is movable between a tape capturing position lying crosswise of the strands of tape intermediate the tape feed assembly and the spools on the takeup shaft, and a tape threading position lying on the diametrically opposite side of the spools from the tape feed assembly. After a set of spools has been filled with tape, the threading bar assembly is moved to the tape capturing position and the strands of tape are clamped to the bar and then severed between the bar and the spools. The wound spools are thereupon removed from the takeup shaft. After reloading an empty set of spools on the takeup shaft, the threading bar assembly is rotated to its threading position causing the strands of tape held captive thereby to be drawn over the spools and thereby, positioning the ends of the tape strands such that they can be attached to the spools prior to initiating a succeeding winding operation.

20 Claims, 10 Drawing Figures

PARALLEL-FEED TAPE SPOOLING APPARATUS FOR CONCURRENT WINDING OF MAGNETIC TAPES ONTO A PLURALITY OF SPOOLS OF THE TYPE USED IN ENDLESS TAPE CARTRIDGES

BACKGROUND OF THE INVENTION

The present invention pertains to apparatus for rapidly spooling magnetic tape onto spools of the type used in endless tape cartridges.

Because of their compact size, and endless operation in one direction of tape advancement, endless magnetic tape cartridges are becoming increasingly popular for both pre-recorded material and blank tapes. There are several existing configurations for endless tape cartridges, but in general they all employ the basic design feature of a single, centrally disposed spool shaped to enable the innermost tape winding to be withdrawn from a position adjacent the hub and from there, guided in an intricate guide path past one or more apertures in the cartridge housing for contact with the magnetic heads, capstan and pinch roller, and hence wound back onto the spool as the outermost winding. For example, one such cartridge configuration is disclosed in U.S. Pat. No. 3,420,461, entitled "Endless Magnetic Tape Cartridge," issued Jan. 7, 1969 to R. P. Cousino. In that cartridge, the inner tape winding is guided around obliquely oriented tape guides which position the plane of the tape, for contact with the magnetic heads, at right angles to the orientation of the tape when wound on the spool. The change in the orientation of the tape results in a more compact cartridge and thus is preferred for many applications.

In endless tape cartridges of the type disclosed in the above-mentioned patent, and in other cartridges of similar design, the unique manner in which the tape is continuously fed from the inner winding to the outer winding requires that the tape be wound onto the spool at a spooling tension that is maintained within a narrow, predetermined range. Too little tension will result in sloppy movement of the tape within the cartridge, while too much tension will inhibit easy, smooth withdrawal of the inner winding of tape from a position adjacent the hub. Thus, the cartridge spools are normally, factory wound under conditions which enable the spooling tension to be carefully regulated. For example, one type of preferred spooling apparatus entails the feeding of a single strand of tape, the tension of which is continuously controlled within preset limits, onto a series of empty spools arranged in a row along a common takeup shaft which is rotated at a controlled speed. As each spool is filled, a tape supply guide is shifted axially relative to the row of spools, causing the continuous strand of tape to pass over a rim of the filled spool and commence winding onto the hub of the adjacent spool. After the last spool in the row is filled, the spooling operation is interrupted and the operator cuts the strands of tape connecting adjacent spools, and removes the spools from the takeup shaft. The spooling tension is controlled by monitoring the position of a tape engaging compliance arm and responsively controlling the tension of the single strand of tape between the supply reel and the spool. It is evident that this serial feed spooling technique simplifies the tension control requirement since it is necessary to monitor the tension in only one strand of tape.

Another advantage of this single strand, serial spooling apparatus is that it requires only minimal handling of the strand of tape by the operator. He must thread the tape onto the first spool. However, thereafter the tape is automatically advanced, in an uninterrupted strand, to the succeeding spools. For many tape cartridges, the tape is so thin, and of such small width, that handling of the tape by the operator is extremely tedious, and frequently leads to twisting and tangling of the tape which decreases productivity.

For the above reasons, the serial spooling type of equipment is currently preferred and is predominantly used throughout the industry. However, because the spooling rate of this type of apparatus is limited to the rate of advancement of a single strand of tape, the process of filling the entire row of spools is time consuming, even when the tape is advanced at a rate many times greater than the playback-record speed. In many tape cartridge production facilities, the spooling time has become a limiting factor in improving the productivity.

One possible solution to stepping up the spooling speed is to wind a plurality of spools simultaneously, by feeding the tape in parallel strands from a plurality of supply reels. While the desirability of a parallel spooling apparatus is apparent, its implementation gives rise to numerous problems, some foreseeable, others less apparent. One problem is that each strand of tape requires a separate tension control, which could be accomplished by duplicating the above-mentioned compliance arm device for each parallel feed path. Such duplication, because of its expense and cumbersomeness, greatly detracts from the speed advantage of a parallel spooler. Moreover, parallel spooling means a substantial increase in the amount of tape handling that must be performed by the operator. After filling each set of spools, cutting the tape and removing the filled spools, the operator must thereupon insert and individually thread the plurality of empty spools prior to the next winding operation. In sum, any advantage in terms of increased spooling speed would be negated by disadvantages and the cost and complexity of the equipment, and in the increase manipulation required of the individual tape strands.

Accordingly, it is an object of the invention to provide an apparatus for increasing the speed of spooling magnetic tape onto spools of the type used in endless tape cartridges, while providing suitable control over the spooling tension of the tape, and without significantly increasing the amount of tape handling that must be performed by the operator of the apparatus.

More specifically, it is an object to provide a multiple-spool, parallel-feed tape spooling apparatus for concurrently winding, in parallel, a plurality of spools of the above-mentioned type, and having suitable control over the spooling tension of the tape and minimizing the amount of handling of the tape that must be performed by the operator of the apparatus. A related object is to provide precision control of the spooling tension without resorting to expensive, cumbersome, duplicative use of compliance arm tension controllers of the type currently used in serial spooling equipment.

Still another object is to provide a multiple-spool, parallel-feed spooling apparatus as above which is capable of filling spools either according to the amount of playback-record time, or according to cue signals prerecorded at intervals along the strands of supply tape.

SUMMARY OF THE INVENTION

The tape spooling apparatus of the invention uses a parallel-feed configuration for concurrently winding tape onto a plurality of spools of the type employed in endless tape cartridges. The spooling tension of the tape is controlled by feeding all of the tapes at the same, predetermined feed rate toward a takeup assembly at which the spools are turned by a takeup shaft that is rotated at a spooling rate slightly greater than the tape feed. To accommodate the speed difference, the spools are individually attached to slip-clutch hub assemblies, one for each spool, which are in turn mounted on the takeup shaft and are drive coupled to the shaft by an adjustable slip-clutch engagement. As the takeup shaft rotates at a faster speed than can be accommodated by the feed assembly, each of the hub assemblies slips on the takeup shaft, wherein the degree of slippage is adjustable on each hub assembly, so as to individually set the tension at which the tape is wound onto the associated spool.

Each of the hub assemblies is preferably provided with a manually operated device for clipping an end of each strand of tape to the hub assembly for initiating the winding of the tape onto the associated spool. To handle the plurality of tape strands and thread them onto succeeding sets of empty spools, a tape threading bar assembly is provided which is movable between a tape capturing position and a spool threading position. In the tape capturing position, the bar assembly which carries a plurality of manually operated tape clamp means is moved into a position extending crosswise of the strands of tape at a location interposed between the feed assembly and the takeup assembly. After a set of spools have been filled, the bar is moved into this tape capturing position and the clamps are operated to clamp the strands of tape to the bar assembly and thereupon the tape strands that extend between the bar assembly and the spools are cut to enable the filled spools to be removed from the takeup shaft. After mounting a new set of empty spools and associated hub assemblies onto the takeup shaft, the threading bar assembly is moved to the spool threading position which lies on the diametrically opposite side of the takeup assembly from the feed assembly. In doing so, the ends of the tape strands that are clamped to the threading bar, are pulled over the hub assemblies and associated spools and into positions for being clipped to the hub assemblies by the above-mentioned means. After doing so, the short sections of tape that extend between the clip means on the hub assemblies and the clamps on the threading bar are cut and another spooling cycle is commenced.

In the preferred embodiment, the above-mentioned pinch rollers are movable by separate, electrically controlled actuators, one for each pinch roller, for individually actuating the pinch rollers between operative positions holding the associated tape strand against the feed roller, and retracted positions in which the pinch rollers are held away from the tape strands and feed roller. Also, a plurality of supply reel brakes are mechanically associated with the movable pinch rollers and are jointly operated therewith by the associated actuators, for braking the individual tape supply reels at the same time that the associated pinch roller is retracted at the end of a winding cycle when the associated spool is full.

Also in this preferred embodiment, the apparatus is provided with two optional modes. In a first mode, the spools are wound with a predetermined length of tape per spool, corresponding to a known playback-record time. For this purpose, the desired playback-record time is set on a counter, and control circuitry, compares the set count with an accumulated number of revolutions of the feed roller, and upon reaching the preset count, a stop signal is produced which simultaneously operates the actuators of the pinch rollers and supply reel brakes. In another mode, cue signals on the strands of supply tape are used to control the amount of tape wound onto each spool and for this purpose magnetic read heads are positioned to read prerecorded cue signals on each strand of tape at a suitable location between the supply reels and the takeup assembly. Control circuits respond to the read heads individually and cause the actuator of the associated pinch roller and reel brake to be operated to stop the tape. When the spooling of all of the strands of tape have been terminated in this manner, the control circuitry stops the rotation of the feed roller, completing the spooling cycle.

The parallel feed apparatus of the invention provides a substantial increase in the number of spools that can be wound during a given period of time. For example, using a single strand, serial feed spooling apparatus and winding thirty minutes of playback-record time on each spool, an operator can produce about forty spools per hour. In contrast, the parallel-feed spooling apparatus of the invention, enables an operator to produce approximately two hundred spools per hour, each being wound with thirty minute tapes. Thus, a five-fold increase in productivity has been achieved with the present invention.

BRIEF DESCRIPTION OF THE DRAWINGS

To provide a complete disclosure of the invention, reference is made to the appended drawings and following description of one particular and preferred embodiment.

FIG. 2 is a fragmentary view, similar to FIG. 1, but depicting the apparatus in a different stage of its operating cycle.

DETAILED DESCRIPTION

Figures 1, 9:
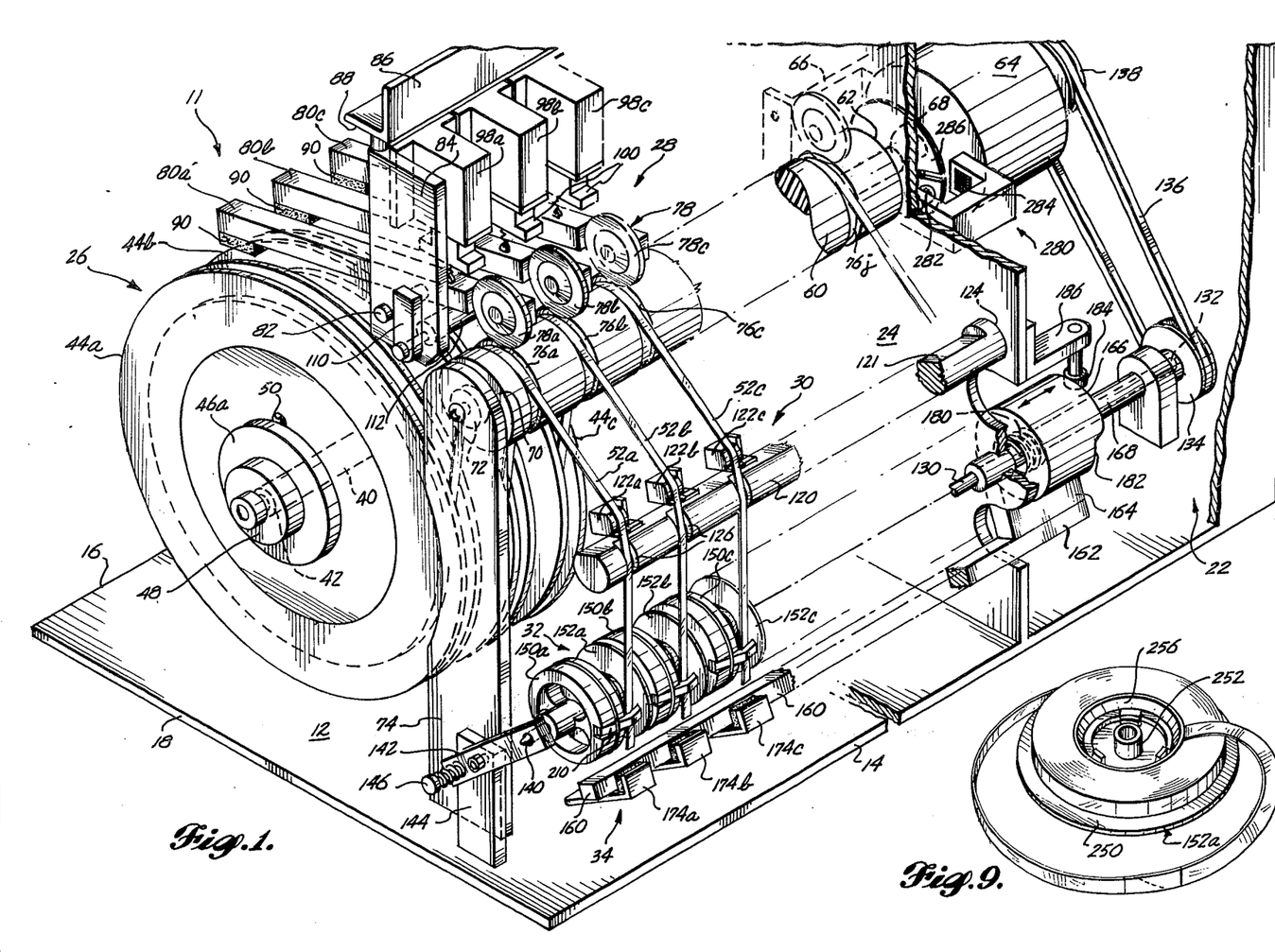
FIG. 1 is a fragmentary, isometric view of the parallel feed, magnetic tape spooling apparatus of the invention, in which portions of the apparatus are cut away for clarity.
FIG. 9 is a detailed view of a completed spool of tape after it has been wound on the spooling apparatus and the ends of the tape have been spliced.

With reference to FIG. 1, a parallel feed, magnetic tape spooling apparatus 11 is illustrated for concurrently winding the tape onto a plurality of spools, of the type shown in FIG. 9, for use in endless tape cartridges. A plurality of ten identical winding stations are provided on apparatus 11, although only three of the ten stations are shown to simplify the drawing. While the apparatus may be modified to provide any desired number of spooling stations, depending upon needed capacity, ten spooling stations has been selected to achieve a suitable balance between the objectives of concurrently winding as many spools as possible for maximizing the production output, and of keeping the size of the apparatus within practical limits so that it does not become too large and cumbersome for the operator to load and unload the supply tape reels and cartridge spools used by the apparatus.

The entire apparatus is mounted on a base plate 12 having a front 14, a rear 16 and sides 18 and 20. A housing 22 for the motor drive and electrical controller components of the apparatus is positioned to one side of base plate 12. A vertical side wall 24 of housing 22 forms a mounting plate to which the principal assemblies of the apparatus are mounted. These include a supply reel assembly 26 which includes a plurality of ten supply reels, one for each winding station; a tape feed assembly 28 for feeding the strands of tape supplied by reel assembly 26 at a controlled feed rate; read-head assembly 30 including a separate read-head for sensing cue signals prerecorded on the tapes at each station; a takeup assembly 32 at which the strands of tape are taken up and thus wound on the individual cartridge spools; and a threading bar assembly 34 for threading the tape strands onto the individual spools.

Supply reel assembly 26 includes a shaft 40 having one end securely affixed to wall 24 such that the opposite end 42 projects outwardly therefrom in cantilevered fashion and terminates adjacent side 18 of base plate 12. The individual supply reels, three of which are shown here as reels 44a, 44b and 44c, are mounted on individual hubs such as shown by hub 46a for reel 44a, which in turn are slid onto shaft 40 after removing a collar nut 48 that threads onto end 42 of the shaft. The center opening of reel 44a fits snugly about the outer circumference of hub 46a and ball bearing detents 50 center the reel on the hub and maintain the reel coaxial with shaft 40. The reel hubs are freely and independently rotatable on shaft 40. Each of the reel hubs has an axial dimension which is selected to longitudinally space reels 44a, 44b and 44c along shaft 40 so that associated tape strands 52a, 52b and 52c withdrawn from these reels, are aligned with tape guide paths established by feed assembly 28 as described more fully below. The tapes are wound on the supply reels with the magnetic recording surface (e.g. the oxide surface) facing outwardly so that strands 52a, 52b and 52c, when wound onto the spools at takeup assembly 32, are oriented with the recording surface facing inwardly.

Feed assembly 28 includes an axially elongated feed roller 60 disposed in spaced parallelism with supply reel shaft 40, at a location on the apparatus that lies generally forwardly and above shaft 40. One end 62 of roller 60 is positioned adjacent housing wall 24 and is turned by a drive motor 64 that is mounted to the opposite side of wall 24 from roller 60 by means of a mounting bracket 66. Motor 64 is coupled to end 62 of roller 60 by a coupling shaft 68 which extends through an opening provided in wall 24. An opposite end 70 of roller 60 is journaled for rotation in a bearing 72 mounted at the upper end of a stanchion 74, the lower end of which is anchored to base plate 12 adjacent side 18. A plurality of axially spaced, circumferential grooves are formed on roller 60, one for each winding station, as illustrated by grooves 76a, 76b and 76c for tape strands 52a, 52b and 52c respectively. Grooves 76a, 76b, 76c are bottomed by a cylindrical capstan surface having a width equal to that of the tape, and are each formed with outwardly divergent side walls which center the tape in the groove and thus laterally guide the tape strands in a fixed, parallel feed path in which underlie a plurality of pinch rollers that cooperate with roller 60.

More particularly, assembly 28 further includes a plurality of electrically actuated pinch rollers as represented by rollers 78a, 78b and 78c rotatably mounted adjacent the forward ends of a corresponding plurality of pivot arms, represented by arms 80a, 80b and 80c, disposed above roller 60 and supply reel assembly 26. Arms 80a, 80b and 80c are pivotally mounted on a shaft 82 that lies parallel to roller 60 at a location elevated above and spaced rearwardly from roller 60. Shaft 82 is supported at the near side end as viewed in FIG. 1 by an end support bracket 84 and at the opposite end (not shown) by side wall 24. An angle shaped support beam 86 (only the near side fragment of which is shown in FIG. 1) is cantilevered from side wall 24 and extends across the top of the apparatus, parallel to feed roller 60. Support bracket 84 is attached to the near side end 88 of beam 86 and depends downwardly from beam 86 for supporting shaft 82 in a position spaced below and parallel to beam 86.

Pivot arms 80a, 80b and 80c are transversely mounted on shaft 82 at pivot points intermediate the ends of the arms and the length dimension of the arms is selected so that their forward ends overlie feed roller 60 and their rear ends overlie the rims of supply reels 44a, 44b and 44c. Adjacent the rear ends of the arms, reel brake pads 90 are secured to the undersides of the arms for movement into engagement with the rims of the various supply reels and thereby braking the rotation of the reels. Arms 80a, 80b and 80c are held in axially spaced relation along shaft 82 by a series of tubular spacers 92 (see FIG. 4) so that the respective pinch rollers 78a, 78b, 78c and reel brake pads 90 are properly aligned with the grooves on feed roller 60 and the rims of the supply reels, respectively.

Arms 80a, 80b and 80c are individually biased to a position in which pinch rollers 78a, 78b, 78c are pressed against the tape strands within the grooves of feed roller 60 by a plurality of tension springs, one for each arm, connected as shown by spring 94 between an elongate, horizontal support member 96 depending widthwise from beam 86 and a point on arm 80a located rearwardly of the pivotal mounting of the arm on shaft 82. Arm 80a is thus biased to rotate clockwise as viewed in FIG. 3 forcing the forward end of arm 80a and the pinch roller 78a mounted thereon downwardly into operative engagement with feed roller 60 and at the same time lifting brake pad 90 at the rear end of the arm off of the rim of supply reel 44a.

Figure 3:
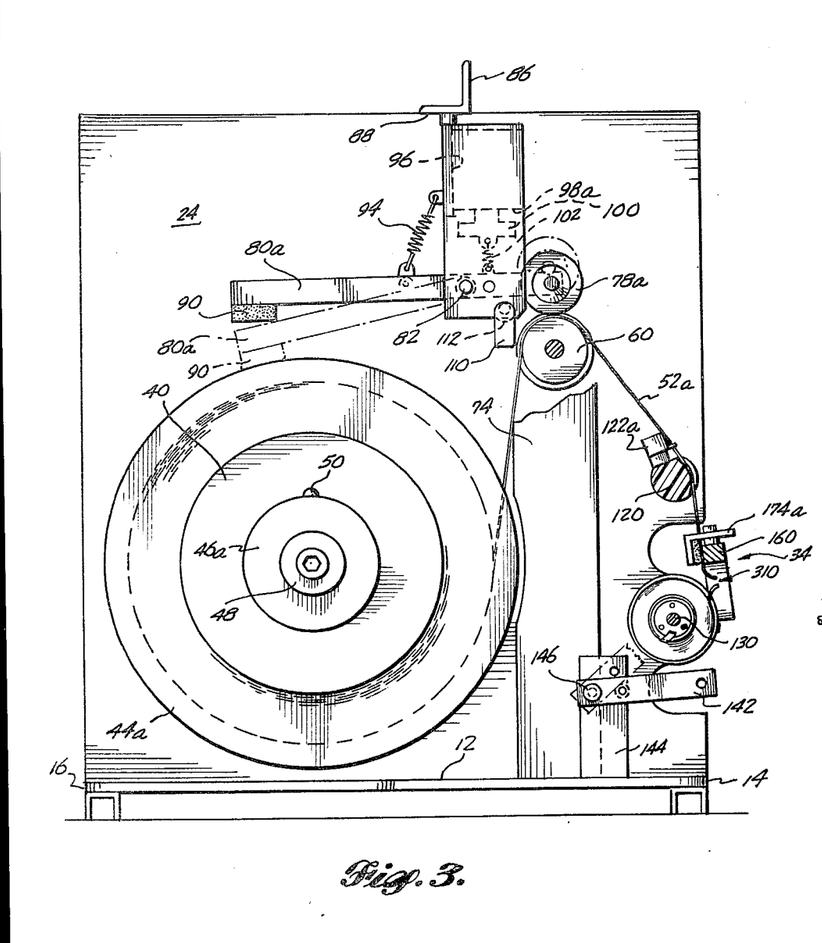
FIG. 3 is a side elevational view of the apparatus as depicted in FIG. 2.

To automatically retract the pinch rollers 78a, 78b, 78c from the feed roller 60, a plurality of solenoids are provided, one for each station, as represented by solenoids 98a, 98b, 98c in FIG. 1, which are mounted above each of the pivot arms 80a, 80b, 80c, respectively, and secured to support member 96 (visible in FIG. 3) with the solenoid plungers 100 reciprocating in a vertical direction. Each plunger 100 is attached to the associated, underlying pivot arm by a tension spring 102 (FIG. 3) which affords flexibility in the connection between the plunger and pivot arm. Each spring 102 joins the associated pivot arm at a point that as shown in FIG. 3 lies forwardly of the pivotal mounting of the arm on shaft 82. When the solenoids are not energized, as shown by solenoid 98a in FIG. 3, plunger 100 is down, allowing arm 80a to assume the position shown by the solid lines in FIG. 3. When any one of the solenoids is energized, such solenoid 98a, the associated plunger 100 is pulled up, causing connecting spring 102 to lift the forward end of arm 80a, rotating it in a counterclockwise arc to the position shown by the dotted lines in FIG. 3, which retracts the pinch roller 78a and applies the brake pad 90 to the rim of the associated supply reel 44a.

With further reference to FIG. 1, pivot arms 80a, 80b, 80c may be disposed in a neutral position by means of a manually operated lever 110 attached to the near side end of an elongate, eccentric roller cam 112 mounted parallel and adjacent to shaft 82 beneath the forward ends of pivot arms 80a, 80b 80c. When cam 112 is rotated by lever 110 to the position shown in FIG. 1, the lower surfaces of arms 80a, 80b, 80c are forced upwardly by an amount sufficient to lift pinch rollers 78a, 78b, 78c up off of feed roller 60, but insufficient to cause the rear ends of the pivot arms to be forced down into braking engagement with the supply reels. The rotation of lever 110 by 180° to the position shown in FIG. 3, turns cam 112 so that it is disengaged from the lower surfaces of the pivot arms, enabling arms 80a, 80b, 80c to assume their normal orientation as shown by the solid line position of arm 80a in FIG. 3.

As shown in FIG. 1 read-head assembly 30 includes an elongate support member 120 of generally cylindrical cross section having a lengthwise oriented flat 121 on which a plurality of cue signal read-heads, one for each station, are mounted as illustrated by heads 122a, 122b, and 122c. One end 124 of member 120 is affixed to housing side wall 24 such that member 120 projects outwardly therefrom, parallel to feed roller 60 at a height intermediate that of roller 60 and takeup assembly 32. Heads 122a, 122b, 122c are mounted at longitudinally spaced intervals along support member 120 and are oriented to face to the front of the apparatus so as to be in contact with the magnetic surfaces of the tapes which face to the rear of the apparatus as strands 52a, 52b, 52c pass between feedroller 60 and take up assembly 32, to the front of the read-heads. To maintain each of the strands of tape in alignment with the associated read-head, a plurality of tape guiding grooves 126 are formed in member 120, each groove having a shape similar to that of grooves 76a, 76b, 76c on roller 60, however, extending only partially about the circumference of member 120.

Takeup assembly 32 includes a takeup shaft 130 oriented parallel to feed roller 60 and journalled for rotation adjacent the front 14 of base plate 12 at an elevation below that of read-head assembly 30. One journalled end 132 shaft 130 extends through side wall 24 into housing 22 and has a drive pulley 134 mounted thereon that cooperates with a belt 136 and another pulley 138 mounted on drive shaft of motor 64 such that motor 64 jointly rotates feed roller 60 and takeup shaft 130. The opposite end 140 of takeup shaft 130 is journalled for rotation in a retractable support bracket 142 which is pivotally and slidably mounted on a stand 144 adjacent side 18 of base plate 12. Bracket 142 is held in an operative, shaft supporting position by a manually operable detent 146.

Takeup shaft 130 is removably loaded with a plurality of assembled slip-clutch hubs and associated spools, one for each winding station, as represented by hub 150a and its associated spool 152a, hub 150b and associated spool 152b, and hub 150c and associated spool 152c. As described more fully herein after, the tape strands are arranged to be threaded onto the plurality of hubs and associated spools for winding the magnetic tapes onto spools 152a, 152b, 152c at carefully controlled spooling tensions as takeup shaft 130 is rotated by drive motor 64 at an overspeed relative to the rotation of feed roller 60.

Figure 4:
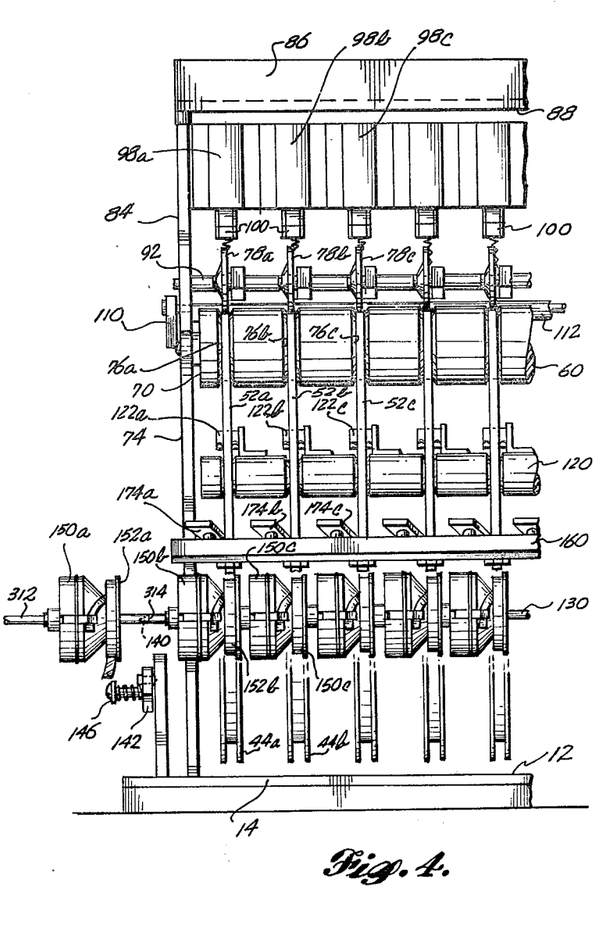
FIG. 4 is a fragmentary, front elevational view showing the configuration of the apparatus at still another stage of its operating cycle.

Threading bar assembly 34 assists in the threading of the strands of tape onto the hubs and spools of takeup assembly 32 and for this purpose includes an elongate bar 160 positioned parallel to takeup shaft 130 adjacent the peripheries of the hubs and spools of assembly 32. One end 162 of bar 160 is connected by an offset 164 to a cylindrically shaped cam 166, which is journalled for rotation on a sleeve 168 that is affixed to housing wall 24 and that is coaxial to takeup shaft 130 as shaft 130 extends between wall 24 and pulley 134. Offset 164 is sized so that bar 160 is rotatable in a half circle which is spaced radially proximate to the peripheries of the hubs and spools and which has a first terminal position as shown in FIG. 1, with bar 160 disposed on the diametrically opposite side of takeup assembly 32 from feed roller 60 and read-head assembly 30, and a second terminal position as shown in FIGS. 2, 3 and 4 where bar 160 is disposed in crosswise contact with the strands of tape 52a, 52b, 52c for intercepting such strands as they pass between read-head assembly 30 and takeup assembly 32.

Mounted on bar 160 at longitudinally spaced intervals are a plurality of manually operated, spring biased tape clamps, one for each winding station, as shown by clamps 174a, 174b, 174c in FIG. 1. Each clamp is roughly L-shaped and is movable between a tape clamping position as illustrated by clamp 174a in FIG. 2 in which the associated strand of tape is held sandwiched between bar 160 and a resiliently compressible pad 176, and an open, tape released position as illustrated by clamps 174b and 174c in FIG. 2. An overcenter mounting of each of clamps 174a, 174b, 174c causes them to remain in the open position, once manually so disposed, until manually flipped to the tape clamping position in which a spring 178 biases the clamps in the tape captivating, closed position.

Bar 160 is also axially shiftable and for this purpose cam 166 is slidably mounted on sleeve 168 and is biased by a compression spring 180 toward the right-hand position as viewed in FIG. 1 to force a contoured, camming end 182 of cam 166 against a camming roller 184 which is mounted by a bracket 186 to side wall 24. End 182 of cam 166 is contoured such that when bar 160 is rotated to the position shown in FIG. 1, the bar and tape clamps 174a, 174b, 174c are shifted to the left, which, as more fully described herein, causes the strands of tape, which are held captive by the threading bar clamps, to be drawn off at an angle to the left of the center of the tape spools 152a, 152b, 152c, and aligned with tape clips provided on the associated hubs 150a, 150b, 150c. Rotation of threading bar 160 to the terminal position shown in FIGS. 3 and 4 causes camming end 182 of cam 166, in cooperation with roller 184 and spring 180, to shift the assembly to the right which as shown in FIG. 4 positions clamps 174a, 174b, 174c in alignment with the strands of tape as the strands extend in straight parallel paths from feed assembly 28 and read-head assembly 30 onto spools 152a, 152b, 152c.

Figures 7, 8, 9:
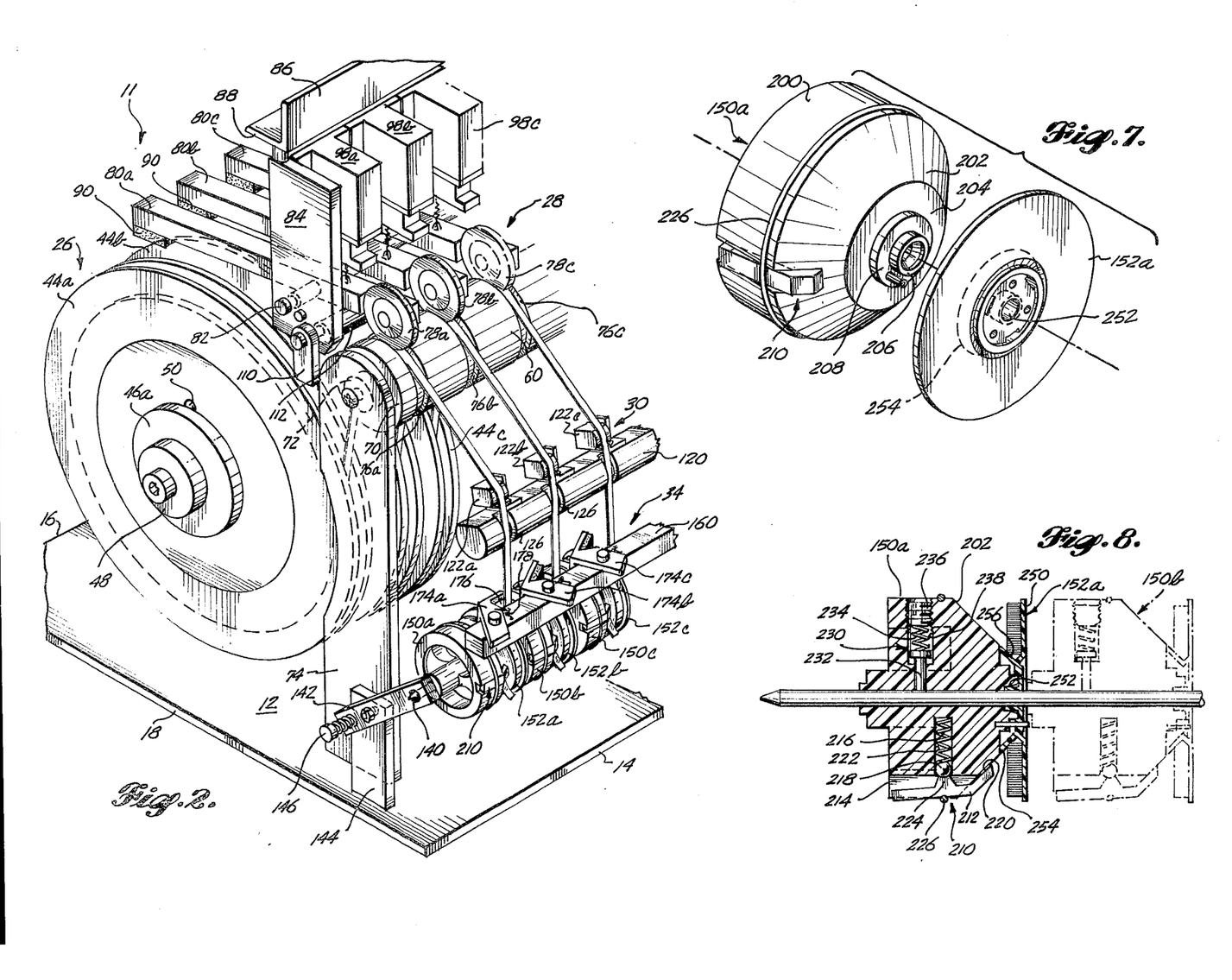
FIG. 7 is an exploded view of a slip-clutch hub and an associated tape spool.
FIG. 8 is a view, partly an axial section and partly in phantom, showing two assembled slip-clutch hubs and tape spools mounted on a takeup shaft of the spooling apparatus of FIG. 1.

The slip-clutch hubs and associated tape spools of takeup assembly 32 are all of identical construction and will be described by reference to hub 150a and spool 152a as shown in FIGS. 7 and 8. Hub 150a has a cylindrical portion 200 and a frusto-conical portion 202 that converges axially outwardly from one axial end of cylindrical portion 200. At a truncated end 204 of frusto-conical portion 202, 150a is formed with an integral, axially projecting, cylindrical bushing 206, concentric with the hub bore and spaced axially outwardly from end 204 by a cylindrical land portion 208 having a diameter intermediate that of truncated end 204 and bushing 206. The inside diameter of bushing 206 is sized so as to form an interference fit with an inner spindle receiving hub portion of tape spool 152a such that spool 152a can be pressed into a snug inner fitting engagement with the hub 200 so as to hold the spool on the hub when loaded onto the takeup shaft 130. As shown in FIG. 8 and as described more fully below, when spool 152 is so interengaged with hub 200, an outer tape spooling hub portion of spool 152a, which has a frusto-conical shape, is oriented to form a continuation of the conically-shaped portion 202 of hub 200.

Mounted on hub 150a is a tape holding clip assembly 210 which as best shown in FIG. 8 includes an elongate lever member 212 arranged axialwise in a slot 214 formed in cylindrical portion 200 and extending into frusto-conical portion 202. Member 212 is biased by a compression spring and cooperating camming ball 216 and 218, respectively, to bias a tape clipping portion 220 of lever member 212 against an axially intermediate surface of frusto-conical portion 202. Spring 216 and ball 218 are held captive in a bore 222 which extends radially inwardly from the bottom of slot 214, wherein ball 218 is arranged to be urged by spring 216 against an irregularly shaped boss 224 on member 212 that enables member 212 to be flipped to a stable open position with clipping portion 220 outwardly spaced from the surface of hub portion 202 or a spring biased closed position with portion 220 pressed against hubs portion 202. A split ring 226 seated in a circumferential groove formed on cylindrical portion 200 of hub 150a retains assembly 210 in place.

With further reference to FIG. 8, hub 150a has an internally mounted slip-clutch assembly 230 which includes a friction pin 232, a compression spring 234 and a set screw 236. These elements are arranged within a countersunk bore 238 such that pin 232 is urged into frictional contact with the outer circumference of takeup shaft 130 by the compressive force of spring 234 developed between an enlarged head portion of pin 232 and set screw 236 which is screwed into internal threads provided in bore 238. The radial position of set screw 236 is thus adjustable to increase or decrease the force by which pin 232 is pressed against shaft 130. As discussed above, the tension at which the tapes are wound onto the spools must be held within a predetermined narrow range of tensions in order to insure the proper circulation of the tape within the endless tape cartridge. The individual slip-clutch assemblies 230 provided on each hub 150a, 150b, 150c of takeup assembly 32 provides the needed control over the spooling tension. It has been found that in order to consistently achieve the same, uniform tension, once set screw 236 has been adjusted, that the material from which pins 232 are made should exhibit certain physical properties or characteristics. In particular, the material should be hard enough so that the pin does not wear too rapidly, and yet not so hard as to cause abrading or gauling of the polished steel shaft. Also the material should be resiliently compressible so that when pressed against the takeup shaft 130 a significant area of surface to surface contact is developed to produce the desired frictional drag. Synthetic materials sold under the names Teflon and Delrin (trademarks of E.I. DuPont de Nemours, of Wilmington, Del.) have been found to provide the proper degree of hardness together with a resiliency that produce a smooth, constant frictional drag against the takeup shaft and yet are sufficiently durable to provide a long wear life for the pin 232. It is observed that pin 232 tend to does wear down after many spooling cycles of the apparatus, however, the shortening of pin 232 due to such wear does not appreciable affect the correlative change in the bias force applied by spring 234. Thus, the frictional drag remains constant and it is not necessary to make frequent readjustments of set screw 236.

Tape spool 152a is of conventional construction and as best shown in FIG. 8 is formed to include a flat disc portion 250 and an inner spindle hub portion 252 and an outer tape spooling hub portion 254, with both hub portions projecting axially outwardly from one side of disc portion 250. Hub portion 252 is also shown in FIG. 9 and it is this portion that fits inside of bushing 206 on slip-clutch hub 150a to hold spool 152a to hub 150a. Hub portion 254 is of a special, frusto-conical shape diverging axially outwardly from disc portion 250 and enables the windings of tape on the spool to migrate from the outermost winding to the innermost winding where the innermost turn of tape is withdrawn from the spool at 256, adjacent hub portion 254. When spool 152a is mounted on hub 150a, frusto-conical portion 202 of hub 150a forms a continuation of the outer, tape spooling surface of frusto-conical hub portion 254 of spool 152a.

Figure 10:
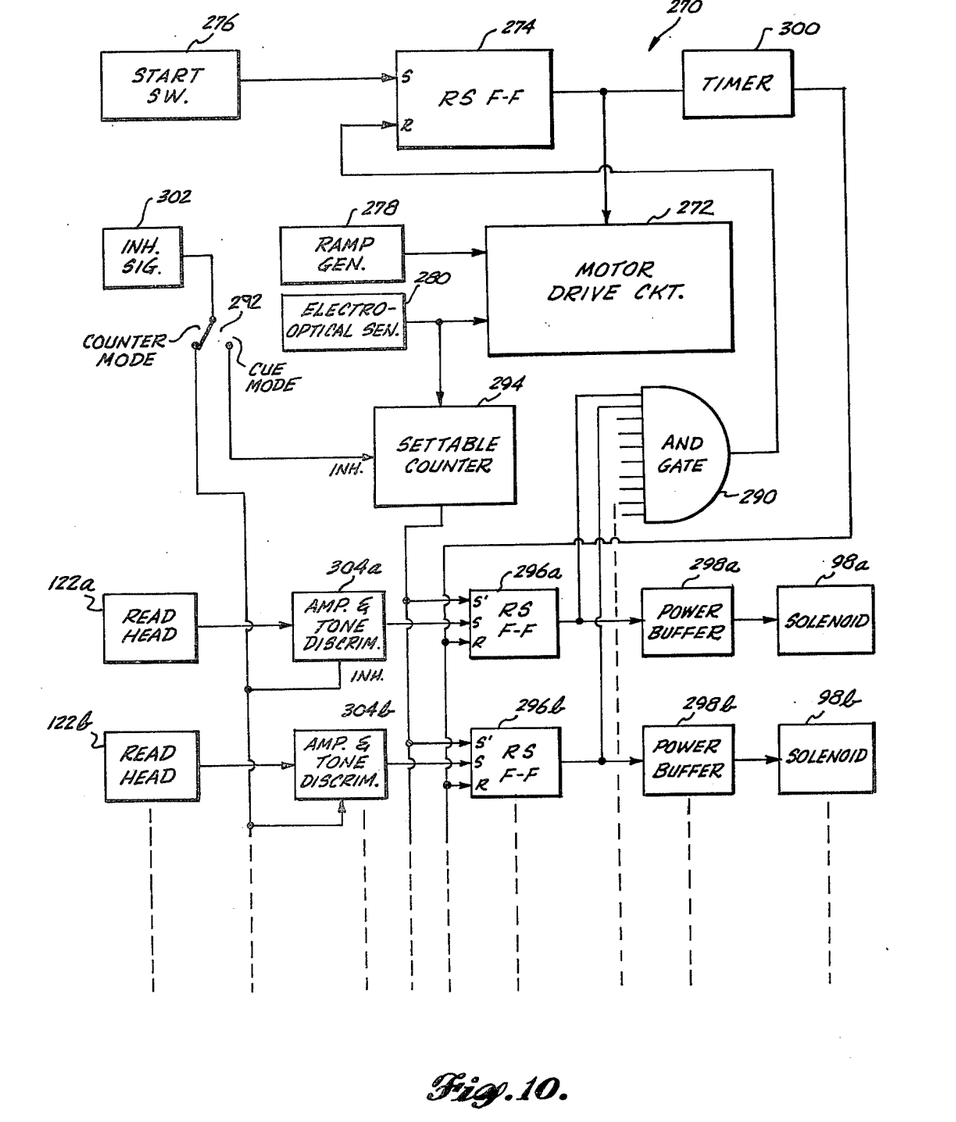
FIG. 10 is a block diagram of the electrical controller for the spooling apparatus.

With reference to FIG. 10, electrical controller 270 serves to start and stop a motor drive circuit 272 which in turn controls the drive motor 64 for feed roller 60 and takeup shaft 130 (FIG. 1). For this purpose, an RS flip-flop 274 is initially set by a manually actuated start switch 276, causing the output of flip-flop 274 to go high and energize motor drive circuit 272. Motor 64 is thereupon accelerated gradually in response to a ramp generator 278 causing motor 64 to be brought to a running speed, such as 400 rpm, established by comparing the frequency of output signals from an electro-optical sensor 280 with a reference signal generated internally of circuit 272 in a well known manner. Sensor 280, as illustrated in FIG. 1 is of conventional construction including a light source 282 and a photocell 284 arranged on opposite sides of an apertured disc 286 mounted for rotation on shaft 68 which couples motor 64 to feed roller 60.

Drive circuit 272 continues to rotate motor 64 at the established rotational speed, until an output signal is produced by a multi-input AND gate 290 which resets flip-flop 274 and causes drive circuit 272 to deenergize motor 64. The output from AND gate 290 can occur in either of two alternative ways, depending upon the selected operating mode of controller 270 established by a mode select switch 292. When switch 292 is positioned in a counter mode, as it is shown in FIG. 10, a setable electro-mechanical counter 294 is enabled to receive the output signal from electro-optical sensor 280 and to compare the number of revolutions of feed roller 60 with a count that has been preset on counter 294 prior to the winding cycle. The preset count establishes the desired length of tape to be wound on each of the spools 152a, 152b, 152c, and is calibrated in terms of the amount of tape time that is to be wound on the spools when recorded or played back at a standard tape speed, such as, 1⅞ inches per second. For this purpose, feed roller 60 has been dimensioned such that each full revolution of the feed roller equals 3 seconds worth of tape time at the 1⅞ inches per second speed.

The output of counter 294 is connected jointly to an auxiliary set inputs' of each of a plurality of RS flip-flops, one for each winding station, represented in FIG. 10 by flip-flops 296a and 296b. Flip-flops 296a, 296b are normally in a reset state and when counter 294 detects that the preset count has been reached as a result of a predetermined number of revolutions of the feed rollers sensed by sensor 280, the output of counter 294 switches all ten of the RS flip-flops 296a, 296b to the set state, which in turn causes all ten inputs of AND gate 290 to go high. The output of gate 290 thus goes high and resets the RS flip-flop 274 which controls motor drive circuit 272, stopping motor 64.

Also as RS flip-flops 296a, 296b are set by counter 294, all ten of the pivot arm solenoids 98a, 98b are simultaneously energized through power buffers 298a, 298b in response to the outputs from flip-flops 296a, 296b. Approximately one second after solenoids 98a, 98b are energized, a timer 300 responding to the switching of RS flip-flop 274 to the reset state, produces an output which jointly resets all of the RS flip-flops 296a, 296b thereby de-energizing the solenoids 98a, 98b at each of the winding stations.

When mode select switch 292 is switched to the cue mode, an inhibit signal 302 is removed from an inhibit input on each of a plurality of ten amplifier and tone discriminators represented by discriminators 304a, 304b, and the inhibit signal 302 is applied to an inhibit input of counter 294, preventing counter 294 from issuing an output signal to the s' inputs of flip-flops 296a, 296b. With controller 270 in the cue mode, the cue read heads 122a, 122b at each winding station respond to cue signals prerecorded on the strands of tape, thereby cueing the ends of the lengths of tape that are to be wound on the tape spools. The cue signals are sensed by read heads 122a, 122b and are amplified and tone discriminated in each associated amplifier and tone discriminator 304a, 304b, which produce at output signal connected to a set input, s, of the associated RS flip-flop 296a, 296b. In this manner, RS flip-flops 296a, 296b are switched from their normal reset set, to the set state, causing the associated solenoid 98a, 98b to pull up and stop the tape feed at that station. When all ten channels have been cued by their respective read heads, and all ten RS flip-flops 296a, 296b have been set, then all ten inputs to AND gate 290 are high and RS flip-flop 294 is thereby reset, stopping drive motor 64. Approximately one second after last solenoid is energized the RS flip-flops are reset thereby de-energizing all solenoids.

Operation

With reference to FIG. 1, apparatus 11 is initially loaded in the following manner. Cam lever 110 is rotated to the up position as shown in FIG. 1, to lift pinch roller 78a, 78b, 78c up off of feed roller 60. Now each supply reel 44a, 44b, 44c is positioned on shaft 40, while slipping the free end of the supply tape sideways of the apparatus along the gap between pinch rollers 78a, 78b, 78c and feed roller 60. Thus, the first supply reel (not shown) is slipped onto shaft 40 at end 42 and positioned adjacent sidewall 24, with the strand of tape draped over feed roller 60, and centered within the associated tape guiding groove 76j. About twelve inches of tape is left hanging over feed roller 60. The remaining supply reels are thus successively loaded onto shaft 40, with the free ends of the respective tapes resting within the associated feed roller grooves and left hanging over feed roller 60.

The tapes are wound on the supply reels 44a, 44b, 44c with the magnetic recording surface (e.g., the oxide surface) facing outwardly, such that the strands of tape 52a, 52b, 52c when withdrawn from the lower, forward side of the reels, pass upwardly and over feed roller 60 with the record surfaces of the tapes in contact with the bottom surfaces of grooves 76a, 76b and 76c of roller 60. After the supply reels of assembly 26 are loaded, locking collar 48 is screwed onto threaded end 42 of shaft 49, to prevent the reels from slipping off the end of the shaft, but allowing each of the reels and associated hubs, e.g., reel 44a and hub 46a, to rotate freely and independently of the other supply reels and associated hubs. Also at this time, the cam lever 110 is rotated to the down position, as shown in FIG. 3, causing the pinch rollers 78a, 78b, 78c to press against feed roller 60 and hold the tape strands in place.

A set of ten hubs and tape spools are assembled, as illustrated by hub 150a and spool 152a in FIGS. 7 and 8, and with support bracket 142 retracted to the position shown in FIGS. 3 and 4, the assembled hubs and spools are slipped over end 140 of takeup shaft 130, forming a horizontal row of empty spools and slip-clutch hubs ready for winding. Bracket 142 is returned to its shaft supporting position and is locked in that position by detent 146.

Now each strand of tape 52a, 52b, 52c is pulled down and across the associated read head guided by grooves 126 of read head assembly 30 and the ends of the tape strands are threaded onto the hubs 150a, 150b, 150c by clipping the ends of the tape to the hubs, using clip assemblies 210. In doing so, hubs 150a, 150b, 150c are all rotated to position clip assemblies 210 to the front of apparatus 11 such as illustrated in FIG. 1. During this initial threading operation, threading bar assembly 34 is in the position shown in FIG. 1, with bar 160 rotated downwardly, and thus on the opposite side of takeup assembly 32 from feed assembly 28. If necessary, the ends of the tape strands should be trimmed such that approximately one-half inch of tape is left extending beyond the retaining clip assembly 210.

Now the spooler is ready to be started. If using the counter mode, switch 292 is positioned as shown in FIG. 10, and counter 294 is set to the desired amount of tape time that is to be wound onto the spools. Having done so, controller 270 is activated by start switch 276, and motor drive circuit 272 gradually accelerates motor 64 up to a rotating speed such as 400 rpm, which in conjunction with the diameter of the feed roller 60, measured at the bottoms of grooves 76a, 76b, 76c, determines the rate at which the tape strands are fed to the takeup assembly 32. As mentioned, shaft 130 of takeup assembly 32 is rotated at an overspeed, and the hubs 150a, 150b, 150c, and the tape spools 152a, 152b, 152c mounted thereon are allowed to slip relative to the rotating takeup shaft 130, by virtue of the individual slip clutch assemblies 230 provided on each hub. The amount of overspeed is not critical and a fifteen to twenty percent overspeed, in terms of spooling rate versus feed rate, has been found satisfactory. As hubs 150a, 150b, 150c and the associated tape spools slip relative to shaft 130, the frictional drag provided by slip clutch assemblies 230 (FIG. 8) effect the desired spooling tension that must be exerted on each of the strands of tape in order to insure the proper movement of the tape within the endless tape cartridge. The manner of adjusting each of the slip clutch assemblies 230 is described more fully below.

At the end of the winding cycle, counter 294 senses that the preset amount of tape has been wound on the spools and simultaneously activates the solenoids 98a, 98b, 98c at each of the winding stations. The associated pinch roller 78a, 78b, 78c are lifted off of roller 60 and the supply reel brake pads 90 are operated, quickly braking the advancement of the strands of tape. Approximately a second later, timer 300 (FIG. 10) causes the solenoids to release, and allows pinch rollers 78a, 78b, 78c to again press the strands of tapes against feed roller 60, which has now stopped rotating.

After the above-described, initial threading operation, used for newly loaded supply tape reels, the strands of tape no longer need to be individually threaded onto the empty spools and hubs of takeup assembly 32, but instead, threading bar assembly 34 is used to rapidly rethread the spools in the following manner. First, the individual tape clamps 174a, 174b, 174c on bar 160 are flipped to the open position, as described above, and bar 160 is rotated approximately 180 degrees up into a position that intercepts the strands of tape as they pass from feed roller 60 (and read head assembly 30) to takeup station 32, while the previously filled tape spools and associated slip-clutch hubs remain on takeup shaft 130, as depicted in FIG. 2. Clamps 174a, 174b, 174c are snapped closed, as shown by clamp 174a in FIG. 2, thereby captivating each of the strands of tape, and holding them firmly to the rearwardly facing edge of bar 160. With the tape strands thus held captive, each strand of tape is cut at a location between threading bar assembly 34 and the fully wound spools on takeup assembly 32, as indicated at 310 in FIG. 3. A pair of scissors may be used for this purpose. Alternatively, an automatic cutting device attached to clamps 174a, 174b, 174c may be used to cut the tape.

With the severed ends of the feed tape strands held captive by assembly 34, the filled spools of tape are withdrawn from takeup shaft 130, by retracting support bracket 142 as shown in FIGS. 3 and 4, and sliding the ten hubs and full tape spools, such as indicated by hub 150a and spool 152a in FIG. 4, off onto a spare shaft 312, which is formed with a female end 314 that mates with the pointed male end 140 of shaft 130. The completed spool 150a is thereafter disassebled from slip-clutch hub 150a, and the ends of the spool tape are spliced as shown in FIG. 9, and the spool of tape is ready to be assembled in an endless tape cartridge.

Figure 5:
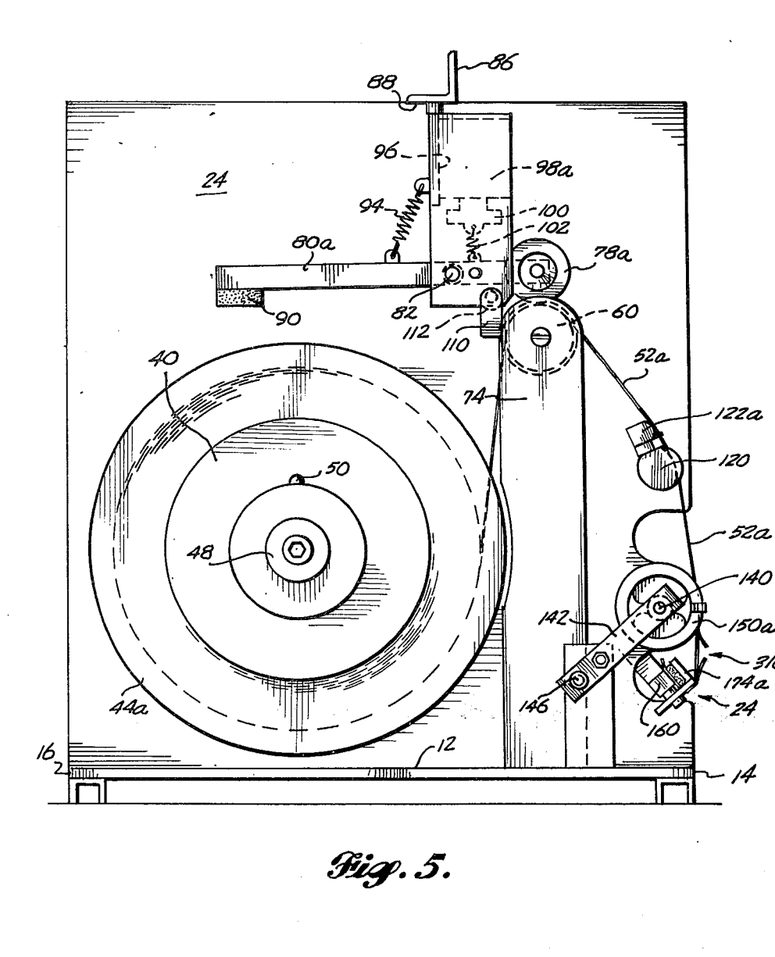
FIG. 5 is another side elevational view, similar to FIG. 3, but depicting the apparatus in still a further stage of its operating cycle.
Figure 6:
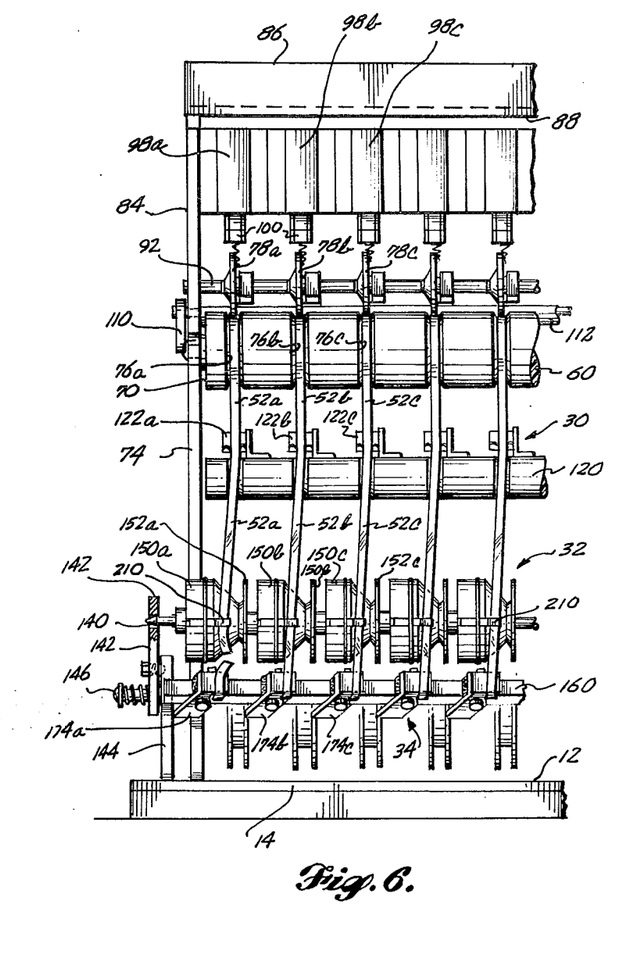
FIG. 6 is a fragmentary, front elevational view of the apparatus as it is depicted in FIG. 5.

After removing the full tape spools, apparatus 11 is reloaded and the strands of tape are threaded onto the empty hubs and spools as shown in FIGS. 5 and 6. In particular, the empty slip-clutch hubs and assembled tape spools are slid onto takeup shaft 130 from another spare shaft preloaded with ten empty hubs and spools, and bracket 142 is returned to its shaft supporting position as shown in FIG. 5. Cam lever 110 is moved to the up position as shown in FIG. 1 to raise the pinch rollers 78a, 78b, 78c up off of the tape strands. Bar 160 of assembly 34 is now rotated forwardly and downwardly, to the position shown in FIGS. 5 and 6, causing the captive strands of tape 52a, 52b, 52c to be drawn forwardly and downwardly across the forwardmost extents of frustoconical portions 202 (FIG. 7) of hubs 150a, 150b, 150c. The axial shifting of bar 160 by cam 166, as described more fully above, causes the clamped ends of the tape strands 52a, 52b, 52c to be shifted to the left (as viewed in FIG. 6) from a position of alignment with tape spools 152a, 152b, 152c. The strands of tape are thus angled to the left, locating the tapes in registration with clip assemblies 210, which are initially disposed in the open position, and rotated on the associated hub 150a, 150b, 150c to trap the associated strand of tape under clip lever 212 (FIG. 8) and then flipped to the closed position. Now each of the strands of tape that extend between the clip assemblies 210 and the clamps of threading bar assembly 34 are severed as indicated at 316, such as by using a pair of scissors or as mentioned above, a cutting device mounted on clamps 174a, 174b, 174c. Cam lever 110 is now returned to the position shown in FIGS. 3 and 4 and the apparatus is at the same operating stage as described above in connection with FIG. 1, following the initial threading procedure and a new winding cycle may be commenced. The tape end bits retained by clamps 174a, 174b, 174c may be released at any time prior to or during the succeeding rethreading operation. Using typical supply tape reels 44a, 44b, 44c, sufficient quantities of supply tape may be wound on reel assembly 26 to enable the filling of twenty or more sets of tape spools, at ten spools per set, before assembly 26 needs to be reloaded.

It is observed that the frusto-conical shape of hub portion 202 of hub 150a (FIG. 8) together with the placement of clip assemblies 210 on the hub and the angulation of the tape stand as threaded thereon, cause the strand of tape to automatically wind down onto the spool hub portion 254 when the winding operation is started. Thus the completed spool has the inner tape winding properly positioned, i.e., protruding axialwise from hub portion 254, and need only be released by clip assembly 210 and spliced to the end of the outer tape winding.

When it is desired to use the cue mode, switch 292 in FIG. 10 is switched from the position shown to the cue mode position at the right, inhibiting counter 294 and enabling amplifier and tone discriminators 304a, 304b, for each winding station. The winding cycle is commenced as described above for the counter mode. The spooling continues for all stations until one of the read heads 122a, 122b senses a cue signal on its associated tape, and causes the associated amplifier and tone discriminator, such as discriminator 304a, to set the associated flip-flop 296a which thereupon operates solenoid 98a to stop the tape feed at that station. Each read head operates independently of the others, causing the tape feed at the various winding stations to stop at diverse times. Drive motor circuit 272 continues to cause drive motor 64 to rotate feed roller 60 until the final winding station has received a cue signal. At that time, the last one of RS flip-flops 296a, 296b is set, causing AND gate 290 to reset flip-flop 274, shutting off drive circuit 272 and causing timer 300 to subsequently de-energize the solenoids by resetting flip-flops 296a, 296b.

Spooling tension is set for each hub 150a by adjusting set screw 236 (FIG. 8). A strand of tape is wound on the attached spool 152a as stated above with one or two turns wound on the spool hub portion 254. A tension gauge is attached to free end of tape. Start switch is now pushed to operate the apparatus. The guage will now read the tape tension and the apparatus is stopped and screw 236 is adjusted as needed. A slight variation of tape tension occurs from the empty to the fully wound condition, as the spool turning torque developed by the strand of tape increases with the gradual increase in the radius of the outer tape winding between the empty and full spool conditions. Such variation is taken into account when preparing the correct loop size when the two ends of tape are spliced together.

While only a particular embodiment has been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. A parallel feed tape spooling apparatus for concurrently winding magnetic recording tape onto a plurality of endless tape cartridge spools of the type in which an endless tape is withdrawn from the innermost winding on the spool and returned to the spool as the outermost winding, comprising:

tape supply means for supplying a plurality of strands of magnetic tape which are to be wound onto a corresponding plurality of spools;

takeup means including a takeup shaft on which a plurality of such spools are arranged side-by-side, for being jointly and coaxially rotated by said takeup shaft;

tape feed means for feeding said strands of tape in spaced parallel feed paths between said tape supply means and the individual spools on said takeup means;

electrically energizable drive means for driving said feed means to advance said strands of tape at a predetermined longitudinal feed rate, and for rotatably driving said takeup shaft at a rotational speed selected such that spools, if rotated at the same speed, would tend to take up said strands of tape at a longitudinal takeup rate that is greater than said longitudinal feed rate; and said takeup means including slip-clutch means coupling said spools to said takeup shaft for causing said spools to rotatively slip relative to said takeup shaft in reaction to tension in the strands of tape so that the longitudinal takeup rate of the strands of tape is limited by and equal to said longitudinal feed rate and so that the strands of tape are wound onto the spools under tension established by frictional forces associated with said slip-clutch means.

2. The parallel feed tape spooling apparatus of claim 1 wherein said slip-clutch means comprises a plurality of spool holding slip-clutch hubs which are coaxially mounted on said takeup shaft, side-by-side; each of said slip-clutch hubs having one axial end thereof formed for detachably, coaxially holding one of the spools such that each adjacent pair of spools are separated by one of said slip-clutch hubs, and each of said slip-clutch hubs having friction means for drive coupling said slip-clutch hub to said takeup shaft such that the tension at which each strand of tape is wound onto a spool is independently established by the frictional means of the associated slip-clutch hub.

3. The parallel feed tape spooling apparatus of claim 2, wherein said friction means of each of said slip-clutch hubs comprises adjustable means for setting the level of friction that drive couples said slip-clutch hub to said takeup shaft.

4. The parallel feed tape spooling apparatus of claim 2, wherein said friction means for drive coupling said slip-clutch hub to said takeup shaft comprises a friction member carried by said hub and movable into contact with said takeup shaft, and spring bias means for continuously urging said friction member into said contact with said takeup shaft.

5. The parallel feed tape spooling apparatus of claim 4, wherein said friction means further comprises means for adjusting the magnitude of spring bias force at which said friction member is continuously urged into contact with said shaft so that the amount of drive coupling friction between said slip-clutch hub and said takeup shaft, which establishes the amount of counteracting tension in the strand of tape being wound on the associated spool, can be adjustably set.

6. The parallel feed tape spooling apparatus of claim 2 wherein each of said spools is of the type that has a flat, disc portion and a coaxial, tape spooling portion, said tape spooling portion being of frusto-conical shape and axially protruding from one side of said disc portion and diverging in a direction away from said disc portion, and wherein each of said slip-clutch hubs has a frusto-conical portion coaxially formed at one axial end, the truncated end of which is formed and sized so as to detachably receive and hold one of said spools with said frusto-conical portion of said slip-clutch hub forming a continuation of said frusto-conical shaped tape spooling portion of said spool.

7. The parallel feed tape spooling apparatus of claim 6, wherein each of said slip-clutch hubs has tape securing means for temporarily holding a strand of tape that has been threaded onto said frusto-conical portion thereof such that when winding of the tape strands is commenced the held strand of tape commences to wind onto said frusto-conical portion of said slip-clutch hub and is guided thereby onto the said frusto-conical shaped tape spooling portion of said spool.

8. The parallel feed tape spooling apparatus of claim 1, further comprising a multiple tape strand threading means including an elongate threading bar disposed parallel to said takeup shaft and mounted for rotation about an axis offset from the lengthwise axis of said threading bar between a tape capturing position in which said threading bar is oriented crosswise of the strands of tape as such strands of tape extend between said tape feed means and the spools on said takeup means, and a tape threading position in which said bar is rotated circumferentially about the spools to a substantially diametrically opposite side of the spools from said tape capturing position and further including a plurality of tape strand clamp means mounted at spaced intervals along said threading bar for clamping said strands of tape to said bar when it is in its tape capturing position, whereby full spools may be removed from said takeup means and replaced by empty spools, and for pulling said strands of tape into threading relation with a plurality of empty spools on said takeup means when said threading bar is rotated to said threading position.

9. The parallel feed tape spooling apparatus of claim 8 wherein said threading bar means further comprises means for axially shifting said bar as said bar is rotated between said tape capturing position and said tape threading position so as to align said clamp means for capturing said tape strands as they extend between said feed means and the spools on said takeup means and to displace said strands of tape to one axial side of said spools when said threading bar is moved to said tape threading position such that the tape strands will be wound onto said spools with the inner most windings having ends that axially protrude from the spools.

10. The parallel feed tape spooling apparatus of claim 1, wherein said feed means comprises an elongate feed roller and a plurality of pinch rollers individually mounted for movement between engaged and disengaged positions with respect to said feed roller for selectively holding the strands of tape in contact with said feed roller, and means coupling said feed roller to said drive means for rotating said feed roller to cause the strands of tape to be fed at said longitudinal feed rate when said pinch rollers are in their engaged positions, and a plurality of electrically controlled, pinch roller actuators individually, cooperatively associated with said pinch rollers for independently moving said pinch rollers between said engaged and disengaged positions, and electrical controller means for individually controlling said actuators.

11. The parallel feed tape spooling apparatus of claim 9, wherein said tape supply means comprises a supply reel support shaft for receiving a plurality of tape supply reels arranged for independent, free dereeling rotation to supply the strands of magnetic tape to said tape feed means, and said tape feed means further comprising a plurality of supply reel brake means, each of which is individually mounted for movement with a separate one of said pinch roller means for braking the dereeling rotation of an associated tape supply reel when the associated one of said pinch rollers is moved to its disengaged position by an associated actuator means.

12. The parallel feed tape spooling apparatus of claim 9 wherein said controller means includes a plurality of magnetic signal read heads cooperatively disposed with the strands of tape at positions between said tape supply means and said takeup means for reading prerecorded cue signals on the strands of tape, and a plurality of separate electrical circuits individually responsive to a separate one of said read head means for independently operating the pinch roller actuators of the associated strand of tape to cause the associated one of said pinch roller to be moved to its disengaged position.

13. The parallel feed tape spooling apparatus to claim 12 wherein said controller means further comprises electrical logic circuit means for de-energizing said drive means when all of said pinch rollers have been moved by their respective actuators to said disengaged positions.

14. The parallel feed tape spooling apparatus of claim 9, wherein said controller means includes counter means for measuring the length of tape wound onto the spools and means for comparing such measured length with a preset signal representing a desired length of tape, and means for jointly operating said pinch roller actuators to move all of said pinch rollers to their disengaged positions and for de-energizing said drive means in response to said counter means.

15. In a parallel feed tape spooling apparatus for concurrently winding magnetic recording tape onto a plurality of endless tape cartridge spools of the type in which an endless tape is withdrawn from the innermost winding on the spool and returned to the spool as the outermost winding and including a tape supply means for supplying a plurality of strands of magnetic tape which are to be wound onto a corresponding plurality of spools, tape feed means for feeding said strands of tape in spaced parallel feed paths from said tape supply means to a takeup means at which the plurality of spools are rotated to cause the strands of tape to be wound thereon, wherein an improvement in said takeup means comprises:

a takeup shaft on which a plurality of the spools are arranged, side by side, for being jointly and coaxially rotated by said takeup shaft;

drive means for rotatably driving said takeup shaft at a rotational speed selected such that the spools, if rotated at the same rotational speed, would tend to takeup the strands of tape at a longitudinal takeup rate that is in excess of the rate at which the strands of tape are fed by said tape feed means; and a plurality of spool holding slip-clutch hubs coaxially mounted on said takeup shaft in alternating side by side relation with respect to the plurality of spools, each of said slip-clutch hubs having one axial end thereof formed for detachably, coaxially holding one of the spools and having friction means for drive coupling said slip-clutch hub to said takeup shaft such that each of said slip-clutch hubs and attached spools are caused to rotatively slip relative to said takeup shaft in reaction to tension in the associated strand of tape so that the longitudinal takeup rate of each strand of tape is limited by and equal to the longitudinal feed rate of the tape strands and so that the strands of tape are wound onto the spools under tension established by said friction means of said slip-clutch hubs.

16. In the parallel feed tape spooling apparatus of claim 15, said friction means of each said slip-clutch hubs comprises adjustable means for setting the level of friction that drive couples said slip-clutch hub to said takeup shaft.

17. In the parallel feed tape spooling apparatus of claim 15, each of the spools being of the type that has a flat, disc portion and a coaxial, tape spooling portion that is of frusto-conical shape, protruding axially from one side of said disc portion and diverging in a direction away from said disc portion, and each of said slip-clutch hubs has a frusto-conical portion coaxially formed at one axial end, the truncated end of which is formed and sized so as to detachably receive and hold one of said spools such that said frusto-conical portion of said slip-clutch hub forms a continuation of said frusto-conical shaped tape spooling portion of said spool.

18. In the parallel feed tape spooling apparatus of claim 17, tape securing means mounted on each of said slip-clutch hubs for temporarily holding a strand of tape that has been threaded onto said frusto-conical portion thereof such that when winding of the tape strands is commenced the held strands of tape commence to wind onto said frusto-conical portions of said slip-clutch hubs and are guided thereby onto said frusto-conical shaped spooling portions of the spools.

19. In a parallel feed tape spooling apparatus for concurrently winding magnetic recording tape onto a plurality of endless tape cartridge spools of the type in which an endless tape is withdrawn from the innermost winding on the spool and returned to the spool as the outermost winding and including a tape supply means for supplying a plurality of strands of tape which are to be wound onto a corresponding plurality of spools, takeup means including a takeup shaft on which a plurality of such spools are arranged, side by side, for being jointly and coaxially rotated by said takeup shaft, and tape feed means for feeding said strands of tape in spaced parallel feed paths from said tape supply means to the spools on said takeup means, the improvement comprising:

a multiple tape strand threading means including an elongate threading bar disposed parallel to said takeup shaft and mounted for rotation with respect thereto, about an axis parallel to said takeup shaft and offset from the lengthwise axis of said threading bar, between a tape capturing position in which said threading bar is oriented crosswise of the strands of tape as such strands of tape extend between said tape feed means and the spools on said takeup means, and a tape threading position in which said threading bar is rotated circumferentially about the spools on said takeup means to a substantially diametrically opposite side of the spools from said tape capturing position, and a plurality of tape strand clamp means mounted at spaced intervals along said threading bar for clamping said strands of tape to said bar when it is in its tape capturing position, whereafter full spools may be removed from said takeup means and replaced by empty spools, and for pulling said strands of tape clamped by said clamping means into threading relation with a plurality of empty spools on said takeup means when said threading bar is rotated to said threading position.

20. In the parallel feed tape spooling apparatus of claim 19, wherein said threading bar means further comprises means for axially shifting said bar as said bar is rotated between said tape capturing position and said tape threading position so as to align said clamp means for capturing said tape strands as they extend between said feed means and the spools on said takeup means when in said tape caturing position, and to displace each of said strands of tape to one axial side of each of the spools when said threading bar is moved to said tape threading position such that the tape strands, when subsequently wound onto the spools, will have an innermost winding which terminates at an end that protrudes axially from the spool.

* * * * *